C. McNEIL.
PROCESS OF JOINING FABRIC SECTIONS.
APPLICATION FILED APR. 13, 1915.
1,220,524.
Patented Mar. 27, 1917.
2 SHEETS—SHEET 1.
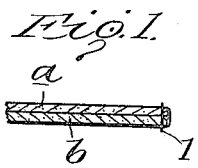
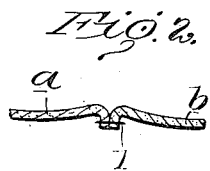
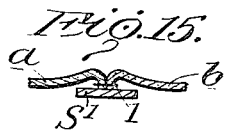
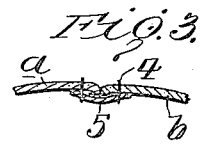
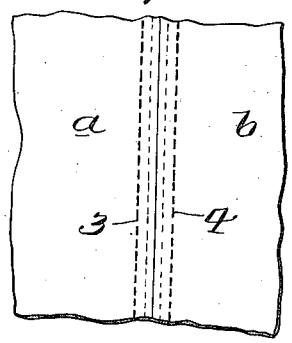
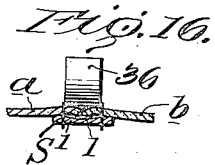
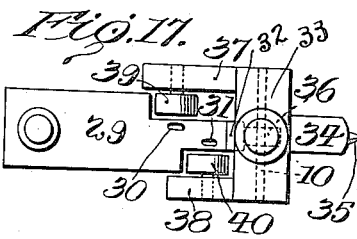
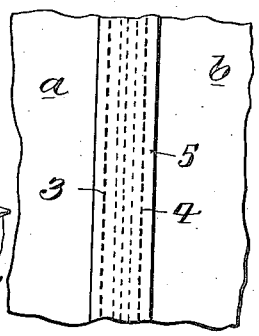
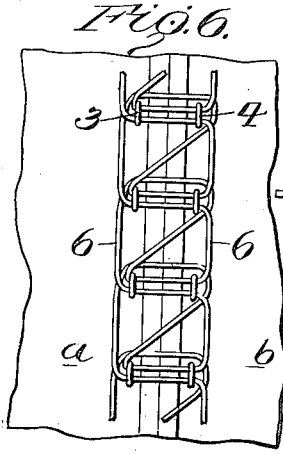
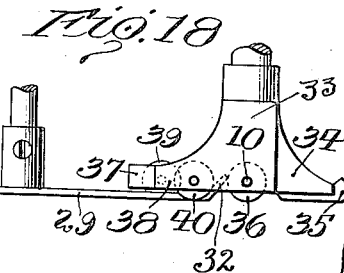
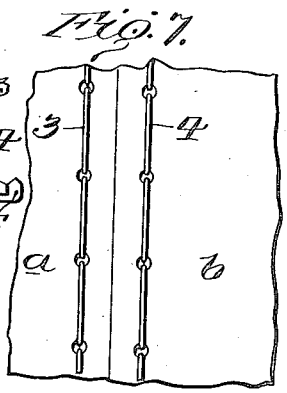
Witnesses
Inventor
C. McNeil
By Shurtwant & Mason
Attorneys C. McNEIL.
PROCESS OF JOINING FABRIC SECTIONS.
APPLICATION FILED APR. 13, 1915.

1,220,524.

Patented Mar. 27, 1917.
2 SHEETS—SHEET 2.

UNITED STATES PATENT OFFICE.

CHESTER McNEIL, OF CHICAGO, ILLINOIS, ASSIGNOR TO UNION SPECIAL MACHINE COMPANY, OF CHICAGO, ILLINOIS, A CORPORATION OF ILLINOIS.

PROCESS OF JOINING FABRIC SECTIONS.

1,220,524.            Specification of Letters Patent.     Patented Mar. 27, 1917.

Application filed April 13, 1915. Serial No. 21,067.

*To all whom it may concern:*

Be it known that I, CHESTER McNEIL, a citizen of the United States, residing at Chicago, in the county of Cook, State of Illinois, have invented certain new and useful Improvements in Processes of Joining Fabric Sections, of which the following is a description, reference being had to the accompanying drawing and to the figures of reference marked thereon.

The invention relates to new and useful improvements in processes of joining fabric sections and more particularly to a process of forming a covering seam for previously joined edges of fabric sections.

An object of the invention is to provide a process of covering a seam of the above character, wherein the fabric sections are held stretched transversely of the seam during the formation of the covering seam, so that the parallel lines of stitching forming a part of the covering seam will be maintained at a substantially uniform distance apart even when the finished seam is placed under strain.

A further object of the invention is to provide a process of forming a seam of the above character, wherein the seam is under strain in a direction transversely of the seam while covering stitches are formed so as to produce a substantially flat seam.

These and other objects will in part be obvious and will in part be hereinafter more fully disclosed.

In the drawings—

Figure 1 is a view showing more or less diagrammatically two sections of fabric having their edges superposed and united by through and through stitches;

Fig. 2 shows the fabric sections turned out into position for covering the joined edges;

Fig. 3 is a sectional view showing the joined edges of the fabric sections covered by my improved process;

Fig. 4 is a top view of the same;

Fig. 5 is a bottom view of the same;

Fig. 6 is a plan view of fabric sections wherein the joined edges are covered by a modified form of covering seam;

Fig. 7 is a bottom view of the same;

Fig. 15 is a sectional view of fabric sections showing a slightly modified form of process of stitching the same;

Fig. 16 is a similar view showing the sections before the same are flattened;

Fig. 17 is a plan view of an apparatus for carrying out the process shown in Fig. 15; and Fig. 18 is a side view of the same.

My improved process is especially adapted for forming a stay seam for covering the united edges of the uppers of shoes.

In Fig. 1 of the drawings, I have illustrated the two sections of an upper of a shoe at *a* and *b*, and these two sections are first superposed and a line of stitching 1 passed through the edge portions thereof. After the sections have been united, as shown in Fig. 1, they are then turned out to the position shown in Fig. 2 of the drawings. The sections of the upper thus united are then passed through a stitching mechanism wherein two parallel rows of stitching 3 and 4 are passed through the respective sections *a* and *b* and through a stay strip 5 which covers the edges of the sections of the upper and unites said sections. This stay strip joins the two lines of stitching 3 and 4, as well as covers the edges of the sections of the upper.

Prior to my invention, it has been found in practice that when the sections of the upper pass through the machine in the position shown in Fig. 5, and the lines of stitching 3 and 4 inserted in the sections of the upper, the lasting of the upper will cause the lines of stitching 3 and 4 to be separated from each other a greater distance than the gage of the machine on which the upper was stitched and this makes an unsightly upper as the trade demands that the lines of stitching passing through and exposed on the outer face of the shoe shall be relatively close together and evenly placed throughout the entire length of the seam.

I have discovered that by placing the sections a and b under strain during the formation of the covering seam, I am able to produce a covered seam wherein the parallel lines of stitching forming a part of the covering seam will always be a uniform distance apart regardless of whether the seam is subsequently placed under strain or not.

In Figs. 6 and 7 of the drawings, I have shown a modified form of covering seam wherein, in place of the stay strip, I use a looper thread. This covering seam consists of the parallel lines of stitching 3 and 4 and a looper thread 6 which joins the parallel rows of needle loops and also covers the edges of the sections of the upper. This looper thread takes the place of the stay strip, as above noted.

Figure 8:
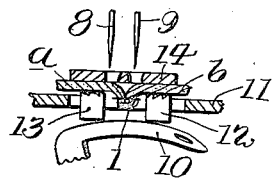
Fig. 8 shows more or less diagrammatically and in section an apparatus for stretching the fabric sections while forming the covering seam shown in Figs. 6 and 7.
Figure 9:
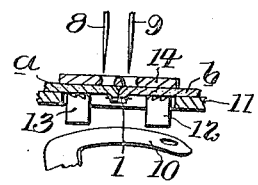
Fig. 9 is a similar view showing the feed dogs moved and the fabric sections placed under strain.

In Figs. 8 and 9, I have shown diagrammatically an apparatus for carrying out my improved process. The sections of the upper a and b, after having been joined and turned out to a position such as shown in Fig. 2, are fed to a sewing machine having two needles 8 and 9. Coöperating with these two needles beneath the work support is a looper 10, which looper lays the looper thread 6 into the needle loops 3 and 4, as shown in Fig. 6. The upper is fed along the work support 11 by feed dogs 12 and 13. A presser foot 14 coöperates with these feed dogs. These feed dogs are so constructed and mounted as to be moved away from each other or transversely of the line of seam, as clearly shown in Fig. 9. After the feed dogs grip the sections of the upper, they are moved away from each other and this causes the fabric sections to be stretched so as to draw down the joined edges so that the sections are substantially flat, and while these sections are thus under strain the needles pass through the respective sections and the looper joins the needle loops, thus completing the covering seam. The fabric sections may be fed to the stitching mechanism by the feed dogs 12 and 13 in which case said feed dogs will move bodily toward and from the needles as well as laterally away from each other. Then again the fabric may be fed by a separate feed dog in which case the dogs 12 and 13 will be merely stretching dogs operating upon the fabric in advance of the main feed dog. In each instance the feed dogs are moved into contact with the fabric and thence for performing their stretching or feeding actions, after which they are disengaged from the fabric and returned in order to position the same for the next feeding action.

Figure 10:
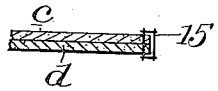
Fig. 10 is a view similar to Fig. 1, showing a modified form of edge joining stitch.
Figure 11:
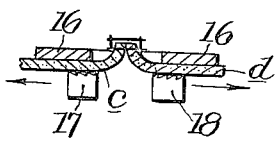
Fig. 11 is a view showing more or less diagrammatically and in section on apparatus for stretching the sections united as shown in Fig. 10.
Figure 12:
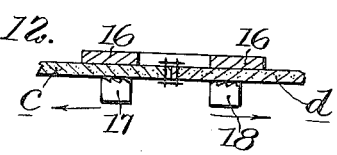
Fig. 12 is a view similar to Fig. 11, showing the feed dogs moved to draw the edges into the same plane.

In Fig. 10 of the drawings, I have shown my improved method as applied to the forming of a flat seam in connection with joining the edges of elastic materials. The two fabric sections c and d are first superposed and their edges joined by overseaming stitches 15. These fabric sections are then turned out to the position shown in Fig. 11, wherein a presser foot 16 coöperates with two feed dogs 17 and 18 in presenting the fabric sections to a stitching mechanism. These feed dogs 17 and 18, as shown by the arrows, are capable of being moved away from each other and when they are thus moved to the position shown in Fig. 12, the two edges of the fabric sections will be drawn down so as to abut and thus form a flat seam.

Figure 13:
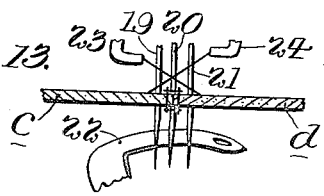
Fig. 13 is a diagrammatic view showing another form of covering stitching mechanism.
Figure 14:
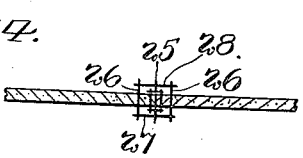
Fig. 14 is a similar view showing diagrammatically the finished seam.

In Fig. 13, I have shown three needles 19, 20 and 21 and a looper 22 which coöperates with all three needles. I have also shown thread laying fingers 23 and 24. While the seam is flat and under strain, it is fed to the stitch forming mechanism shown in Fig. 13, which results in forming a covering seam consisting of a center line of loops 25, two parallel lines of loops 26, which are anchored in the fabric sections, a connecting thread 27 beneath the fabric and connecting threads 28 above the fabric. This forms a flat covered seam.

Then again I may superpose two sections of elastic fabric, trim the edges thereof and unite the same by through and through stitches passing through the edge portions of said sections and then subsequently turn out said sections as described in connection with the seam shown in Fig. 2 and pass the same through a stretching and stitching mechanism which will stretch the sections in order to bring the edges of the sections into substantially abutted position and cover the same by the threads of the stitching mechanism so as to form a substantially flat seam. When knit material or elastic fabric is operated upon in this way the edges may be brought into much nearer abutted position than when leather is operated upon as shown in Figs. 1 and 2 inclusive.

Instead of placing the fabric under strain for flattening the seam I may also accomplish a flat seam by applying pressure to the united edges as shown in Figs. 15 to 18 inclusive. The two fabric sections a and b are first superposed and united by a line of stitching 1, after which said sections are turned out and are fed through a machine having a stitching mechanism consisting of spaced needles and rollers for flattening out the seam. A presser foot 29 is provided with needle openings 30 and 31 through which two needles pass for stitching a stay strip to the previously united fabric sections. This presser foot is formed with an upturned toe 32. Located directly in advance of the presser foot is a carrier 33 which may be supported from the overhanging arm of the machine and this carrier has a forwardly projecting bracket 34 carrying a fin 35 which is adapted to guide the same between the needles 30 and 31. This carrier 33 is provided with a roller 36 which is adapted to engage the fabric sections directly above the abutted edges and the stay strip and this roller flattens the seam as clearly shown in Fig. 16. The carrier also has two rearwardly projecting arms 37 and 38 which carry respectively the rollers 39 and 40. These rollers also engage the respective fabric sections and as they are located alongside of the needles 30 and 31 they will hold the seam which has been flattened by the roller 36 until said seam is stitched. The needles 30 and 31 pass through the flattened sections of the fabric and through the stay strip indicated at S' and thus the seam is held flat. In this process of joining the edges the seam is flattened by pressure while in the other processes above described the seam is flattened by a lateral strain on the fabric sections. Inasmuch as the sections of the fabric are more or less curved when initially turned out the vertical pressure in a sense, produces a lateral transverse strain.

It will be noted that the stay strip is secured across the edges of the joined sections of fabric and when the parallel lines of stitching are passed through the stay strip said stay strip acts as a brace or tie and prevents the sections from returning to their initial positions, thus holding the sections in substantially the same plane or flat. This same purpose is accomplished by the cross threads which join the needle threads.

From the above description, it will be apparent that I have provided a method of forming a covering seam for previously joined edges of fabric, which on the one hand, forms a covered seam wherein the parallel lines of stitching forming a part of the covering seam will always be maintained a uniform distance apart even though the finished seam be placed under strain and where, on the other hand, the joined edges of fabric will be caused to abut and the seam produced will be a flat seam. Both these results are accomplished by the placing of the fabric sections either under transverse strain or under pressure during the formation of the covering seam. It will be understood that the covering seam may be in other ways modified without departing from the spirit of the invention, which consists primarily in the flattening of the fabric sections previous to, and holding the fabric flattened during the formation of the covering seam. It is essential, however, that this covering seam shall consist of parallel lines of stitching disposed on opposite sides of the lines of stitching uniting the edges and that said parallel lines of stitching shall be connected at least on one side of the fabric either by a stay strip or by a looper thread which constitutes connected parallel lines of stitching.

Having thus described my invention, what I claim as new and desire to secure by Letters Patent, is:

1. The process of joining fabric sections consisting in uniting the superposed edges of the fabric sections by stitching, opening the sections of fabric until the major portions lie in substantially the same plane, exerting a strain on the respective fabric sections in opposite directions away from and transversely of the line of stitching, and uniting said fabric sections while under said strain by connected parallel lines of stitches disposed respectively on opposite sides of the first line of stitching.

2. The process of joining fabric sections consisting in uniting the superposed edges of fabric sections by a line of through and through stitching, opening the sections of fabric until the major portions lie in substantially the same plane, exerting a strain on the respective fabric sections in opposite directions away from and transversely of the line of stitching and passing parallel lines of stitching of a covering seam through the respective sections on opposite sides of the first line of stitching while the fabric sections are under strain.

3. The process of joining fabric sections consisting in uniting the superposed edges of fabric sections by a line of through and through stitching, opening the sections of fabric until the major portions lie in substantially the same plane, exerting a strain on the respective fabric sections in opposite directions away from and transversely of the line of stitching, and stitching a stay strip to the fabric sections while under said strain by parallel lines of stitching passing through the stay strip and respectively through the fabric sections.

In testimony whereof, I affix my signature in the presence of two witnesses.

CHESTER McNEIL.

Witnesses:
I. GEORGE TATE,
A. B. CLOTHIER.